United States Patent [19]

Anderson

[11] Patent Number: 5,254,044
[45] Date of Patent: Oct. 19, 1993

[54] CONTROL SYSTEM FOR ADJUSTING BICYCLE GEAR RATIOS

[76] Inventor: Paul M. Anderson, 3167 Carnegie Pl., San Diego, Calif. 92122

[21] Appl. No.: 772,163

[22] Filed: Oct. 7, 1991

[51] Int. Cl.[5] ............................................. F16H 61/00
[52] U.S. Cl. ....................................... 474/70; 474/80; 474/103; 474/109; 364/426.04
[58] Field of Search ................. 474/70, 78, 80, 103, 474/109; 180/231; 280/261, 236; 364/426.04; 475/297, 299

[56] References Cited

U.S. PATENT DOCUMENTS

| | | | |
|---|---|---|---|
| 3,830,521 | 8/1974 | Gardel et al. | 474/70 X |
| 3,919,891 | 11/1975 | Stuhlmuller et al. | 474/70 |
| 4,122,907 | 10/1978 | Davidson et al. | 280/214 X |
| 4,490,127 | 12/1984 | Matsumoto et al. | 474/71 X |
| 5,059,158 | 10/1991 | Bellio et al. | 474/70 |

*Primary Examiner*—Ramon S. Britts
*Assistant Examiner*—Roger J. Schoeppel
*Attorney, Agent, or Firm*—Ellsworth R. Roston; Charles H. Schwartz

[57] ABSTRACT

A bicycle has front and rear wheels, a sprocket coupled to a pedal crank, a sprocket gear, gears on the rear wheel and a gear chain extending around the sprocket gear and an individual one of the rear wheel gears. The chain is adjustably coupled to the individual gears on the rear wheel to respectively increase and decrease the gear ratio relative to the sprocket gear for sprocket speeds above the upper limit and below the lower limit. The upper limit is adjustable as by initially operating up and down switches together within a particular time limit and then operating the up switch for upper limit increments or the down switch for upper limit decrements. The sequence may then be repeated for lower limit adjustments. The movement of a particular number of sprocket ribs past a detector and the time for such movement are measured and processed to determine the sprocket speed. When the sprocket is rotating continuously at a speed below the lower limit, as when coasting downhill, the gear ratio is not changed. The system power is discontinued for no sprocket movement for a continuous time greater than the limited time.

58 Claims, 7 Drawing Sheets

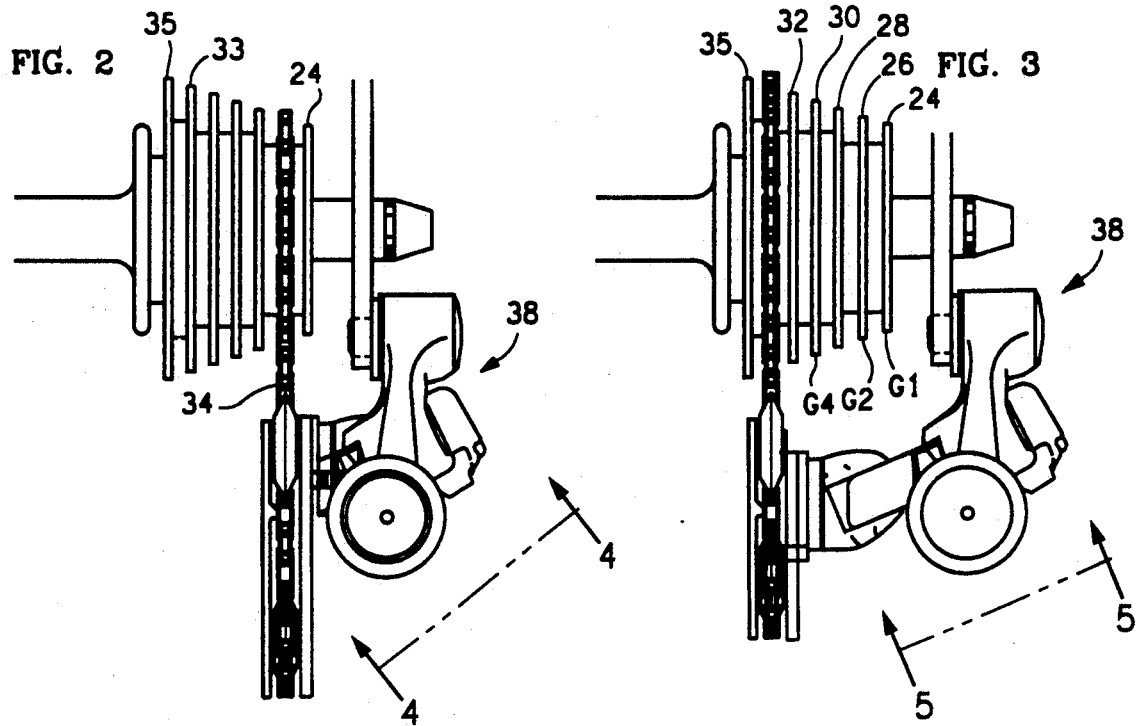
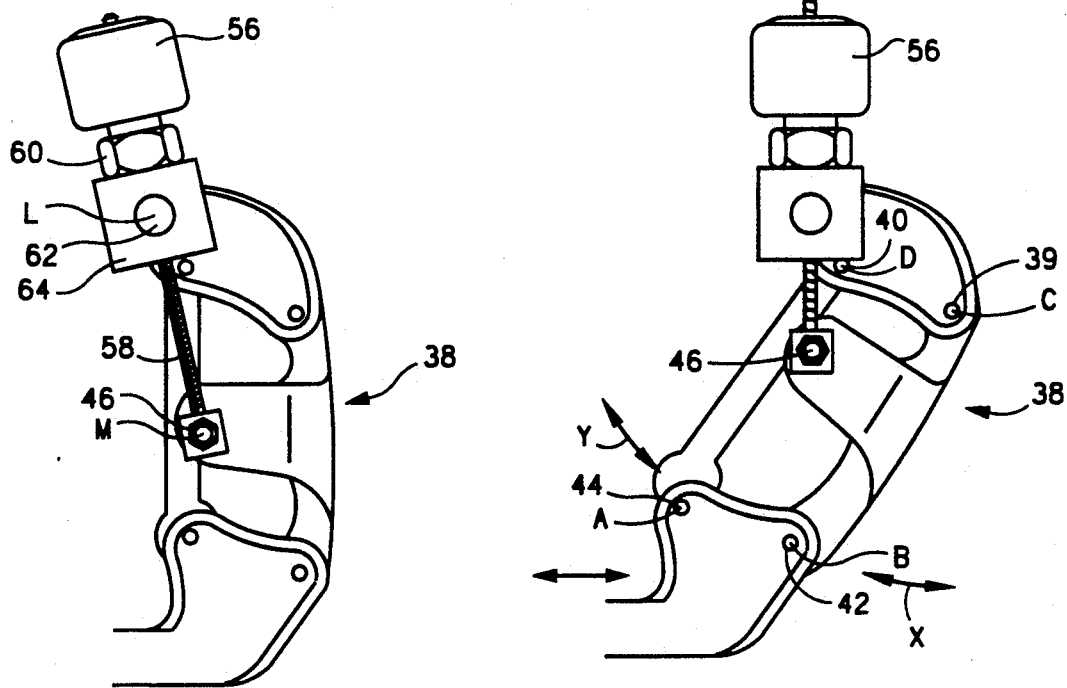

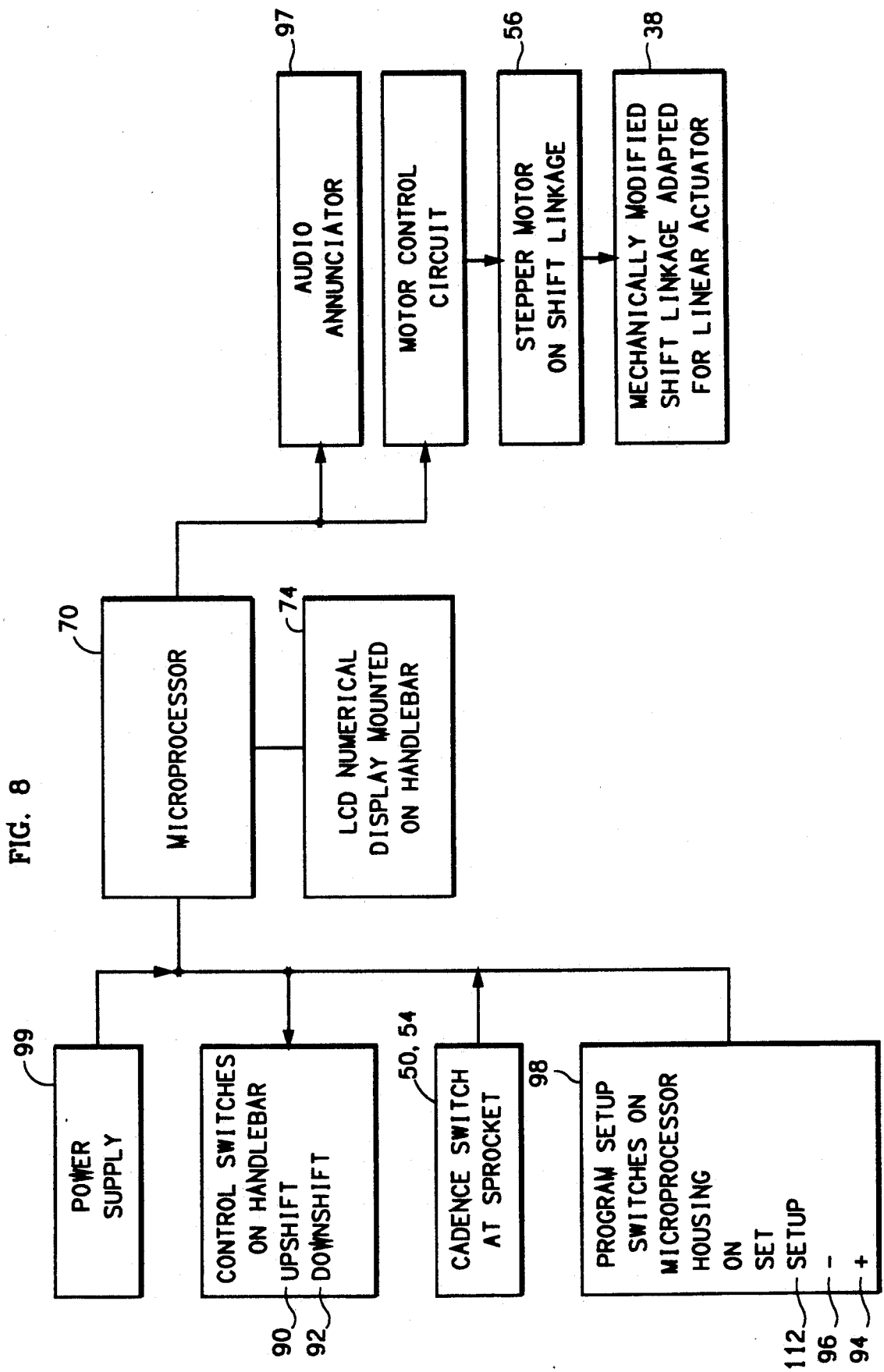

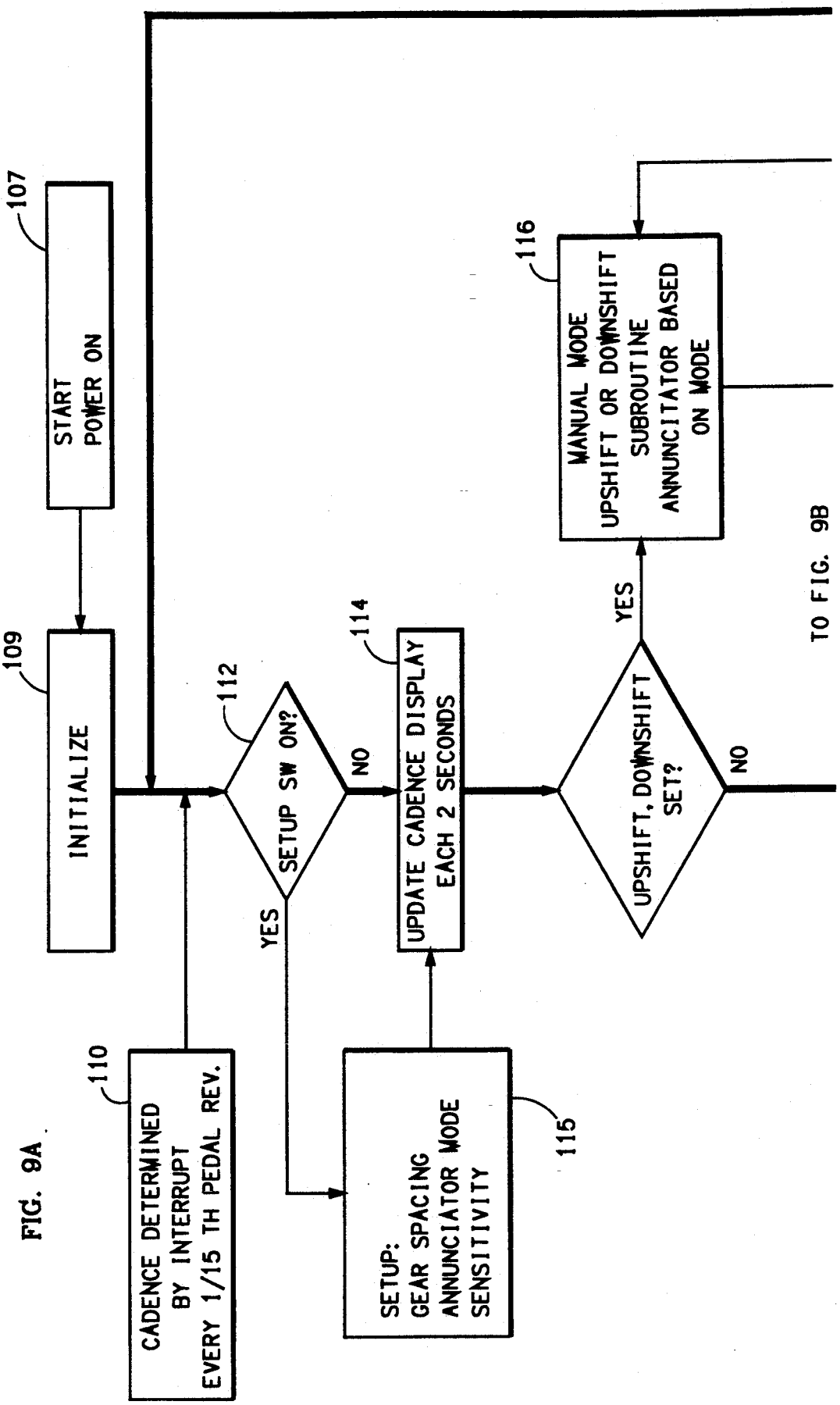

CONTROL SYSTEM FOR ADJUSTING BICYCLE GEAR RATIOS

This invention relates to a bicycle which includes a gear-operated system for controlling the gear ratios in the bicycle to facilitate the operation of the bicycle by the cyclist. More particularly, the invention relates to a bicycle including a microprocessor-operated system in which the speed of a sprocket on the bicycle pedal crank is detected at each instant to adjust the gear ratio for maintaining the sprocket speed within a particular range. The invention further relates to a bicycle including a microprocessor-operated system for providing other functions such as adjustments in the upper and lower limits of the particular range of sprocket speed and adjustments in the sensitivity of measurement of sprocket speed. The system also provides for a manual control of the microprocessor operation to adjust the gear ratio on the bicycle.

A bicycle is probably the most commonly used form of transportation through the world. In many of the less developed countries, it is the sole means of transportation for many people. For example, in China, this is probably the form of transportation used by most of the people. In developed countries such as the United States, it is sometimes used as a form of transportation. More commonly, however, in developed countries such as the United States, a bicycle is used for relaxation during leisure hours and also for exercise.

All bicycles include a front wheel, a rear wheel, a sprocket between the wheels, a pedal crank for mounting the sprocket, pedals for rotating the sprocket and a gear chain for engaging a gear on the sprocket and a gear on the rear wheel. When the rider engages the pedals on the sprocket, the sprocket rotates and drives the rear wheel. The front wheel follows the rotation of the rear wheel.

Originally, bicycles had only a single gear on the sprocket and a single gear on the rear wheel. This was generally satisfactory for riding on level surfaces. However, this single-gear ratio placed a great burden on the cyclist when the road was inclined. For example, on a somewhat steep incline, the burden on the cyclist was often so great that the cyclist dismounted from the bicycle and walked up the incline while pushing the bicycle manually. The burden on the cyclist was also so great during acceleration from a standstill position that the cyclist had to stand on the pedals so as to impart a sufficient force for accelerating the bicycle. The speed of the bicycle was also somewhat limited by the inability of the cyclist to rotate the sprocket at high speeds for long periods of time.

Several decades ago, apparatus was provided in bicycles for manually shifting between different gears. One such apparatus was known as a derailleur apparatus. In such systems, different gears were provided on the rear wheel of a bicycle. A cable extended from the handlebars of the bicycle. When the cable was operated by a multi-position control on the handle bar of the bicycle, a chain gear was moved between individual ones of the different gears in accordance with the operation of such control. The gear chain formed a closed loop with the selected one of such gears and a gear on the sprocket. In this way, the ratio between the gears on the rear wheel and the gear on the sprocket could be adjusted manually by the cyclist in accordance with the speed of rotation of the sprocket.

In recent years, an attempt has been made in U.S. Pat. No. 4,605,240 issued on Aug. 2, 1986, to William E. Clem and William C. Tretheway for an "Electronically Controlled Bicycle Transmission" to provide a computerized system for automatically controlling the operation of a bicycle. In U.S. Pat. No. 4,605,240, the gears on the rear wheel of a bicycle are automatically selected by the computer in accordance with the speed at which the rear wheel is rotating. Although the system of U.S. Pat. No. 4,605,240 appears to constitute the first attempt to computerize the selection of individual gears on a bicycle, the system is somewhat crude and limited from a practical standpoint. For example, the system does not control the selection of gears on the rear wheel in accordance with the speed of rotation of the sprocket. Controlling the gear selection in accordance with the speed of sprocket rotation is desirable because this tends to regulate the effort of the cyclist in moving the bicycle forwardly.

It has been determined that the most efficient way to ride a bicycle is to operate at a constant pedal speed or cadence independent of the speed of the bicycle. Cadence is defined as the speed at which the sprocket rotates. This is a primary reason that modern bicycles have a large number of gear ratios available. Operation for extended periods over a wide range of cadence is relatively inefficient. Although constant cadence is desirable, it is a goal that is not currently achieved due to the requirement that a cyclist constantly monitor his cadence and make frequent adjustments. Although cadence should be constant for high efficiency, the ideal cadence is different for different cyclists or for the same cyclist under different conditions.

The system of U.S. Pat. No. 4,605,240 also does not provide for easy adjustment in the speeds at which the gears are selected so as to satisfy the individual needs or desires of the cyclist. U.S. Pat. No. 4,605,240 is also disadvantageous in that it does not select gears based on cadence but rather on rear wheel speed. Since cadence is not monitored and front sprocket selection is not monitored, the microprocessor cannot control cadence variations related to the size of the selected front sprocket. Since modern bicycles can have a range of front sprockets that vary in diameter by a factor of 2 or so, monitoring of the speed of the rear wheel only could allow cadence variation of one hundred percent (100%) depending on the front sprocket selection.

The system of U.S. Pat. No. 4,605,240 is also disadvantageous in that it produces changes in the gear selected even while the bicycle is coasting. Thus, for example, when the bicycle moves from a level road to a hill and then to a level road again, the system of U.S. Pat. No. 4,605,240 shifts gears upwardly while the rider is coasting down the hill and the bicycle is accelerating. The bicycle is thus in a high gear ratio when the bicycle reaches the level road at the bottom of the hill. This imposes a great strain on the cyclist to drive the sprocket at a speed for rotating the rear wheel at the high speed indicated by the selected gear ratio. U.S. Pat. No. 4,605,240 is also disadvantageous in that it relies on a multitude of mechanical limit switches that add complexity, weight and positioning uncertainty due to the inability of mechanical switches to operate and indicate identical mechanical positions of the cam as the cam approaches the switch from either direction.

One purpose of this invention is to provide a method to constantly monitor cadence in order to automatically maintain a gear ratio that will allow for a nearly constant ideal cadence as determined and selected by the cyclist. This concept should interest cyclists who are infrequent or new riders who do not know how or when to shift. It should be of interest to experienced cyclists who wish to optimize their performance by regulating their cadence on training rides.

In one embodiment of the invention, a bicycle has front and rear wheels a sprocket coupled to the pedal crank, a gear on the sprocket, a plurality of gears on the rear wheel and a gear chain extending in a closed loop around the sprocket gear and an individual one of the rear wheel gears. The chain is adjustably coupled to the individual gears on the rear wheel to increase and decrease the gear ratio relative to the sprocket gear for sprocket speeds above an upper limit and below a lower limit. The upper limit is adjustable as by initially operating up and down switches together within a particular time limit and then operating the up switch for upper limit increments or the down switch for upper limit decrements. The sequence may then be repeated for lower limit adjustments.

The movement of a particular number of sprocket ribs past a detector and the time for such movement are measured and processed to determine the sprocket speed. The particular count of sprocket ribs is adjustable to vary the sensitivity of the sprocket speed measurements. When the sprocket is operating at a speed below the lowest limit, the microprocessor determines that the bicycle is coasting and the gear ratio is not changed. If the sprocket rib movement has not occurred during the limited time, the system will turn off its power in order to extend battery life. The gear ratio on the rear wheels may be increased by manually operating the up switch without initially operating the up and down switches together and may be decreased by similarly operating the down switch manually.

In the drawings:

FIG. 2 is a fragmentary plan view of a gear mechanism with a plurality of gears on the rear wheel of the bicycle shown in FIG. 1 and with the gear mechanism in position to select a first or third individual one of the gears in the plurality;

FIG. 3 is a fragmentary plan view of the gear mechanism of FIG. 2 with the gear mechanism in position to select a fifth or seventh individual one of the gears in the gear mechanism;

FIG. 4 is a fragmentary sectional view taken substantially on the line 4—4 of FIG. 2 and illustrates the positioning of different members in the gear mechanism of FIGS. 2 and 3 in accordance with the selection of the first or third individual one of the gears in the gear mechanism;

FIG. 5 is a fragmentary sectional view taken substantially on the line 5—5 of FIG. 3 and illustrates the positioning of the different members in the gear mechanism of FIGS. 2 to 4 in accordance with the selection of the fifth or seventh individual one of the gears in the gear mechanism;

FIG. 8 is a block diagram schematically illustrating the operation of the microprocessor system constituting this invention for selecting individual ones of the gears on the rear wheel;

Figure 1:
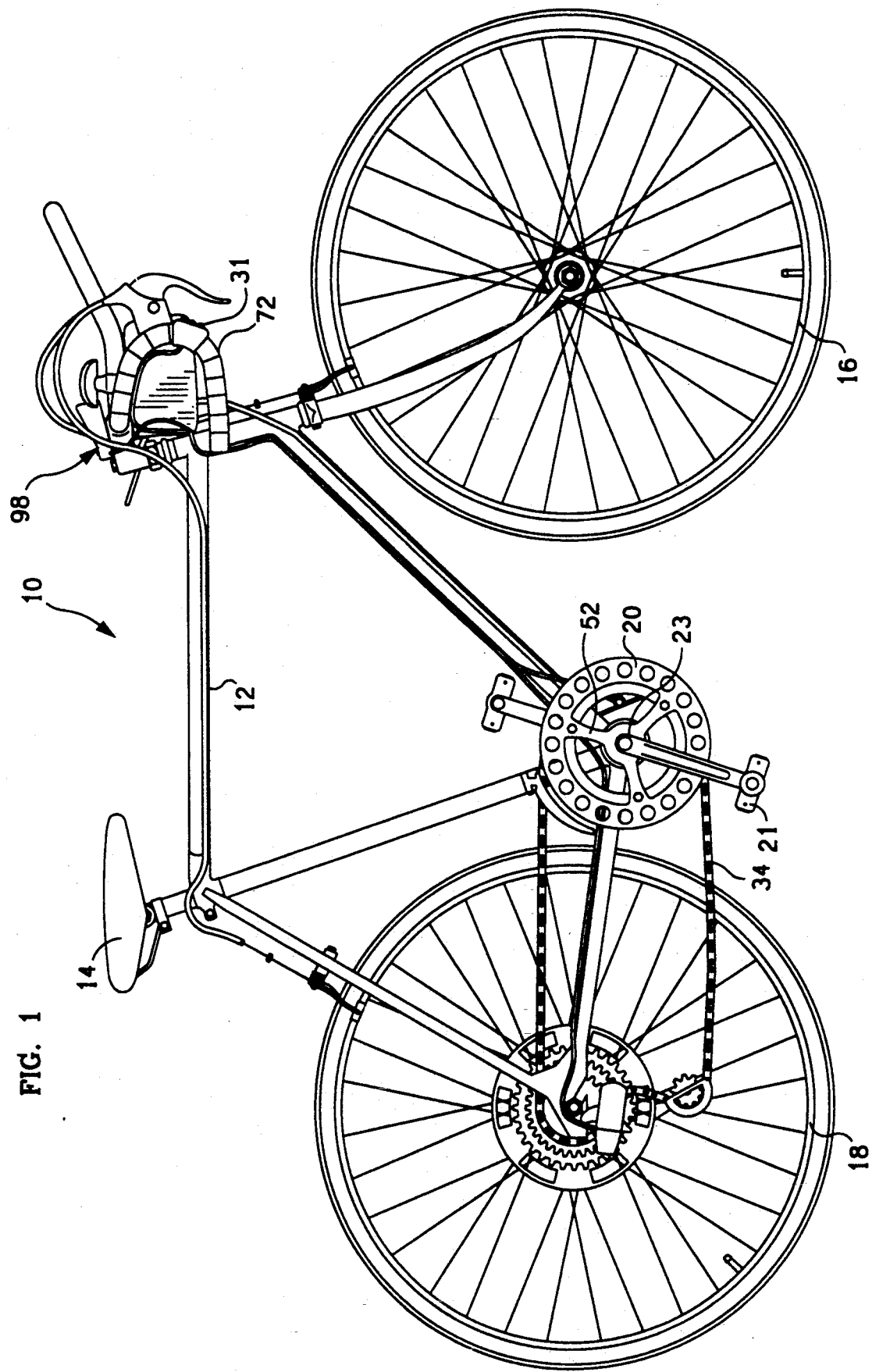
FIG. 1 is a front elevational view of a bicycle constituting one embodiment of this invention.
Figure 6:
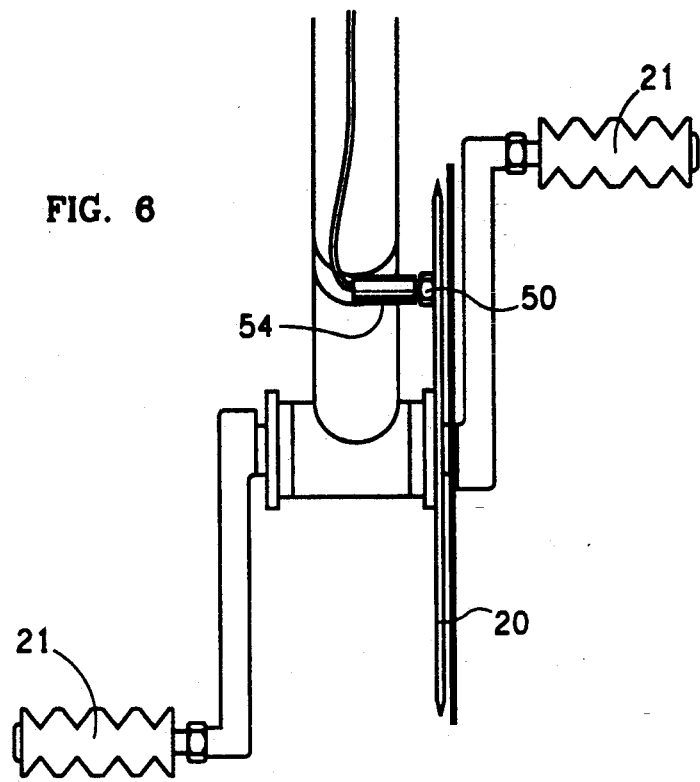
FIG. 6 is a fragmentary elevational view of the sprocket assembly including the sprocket and the pedals and further illustrates the mechanism included in the sprocket assembly for determining the speed of the sprocket at each instant.
Figure 9B:
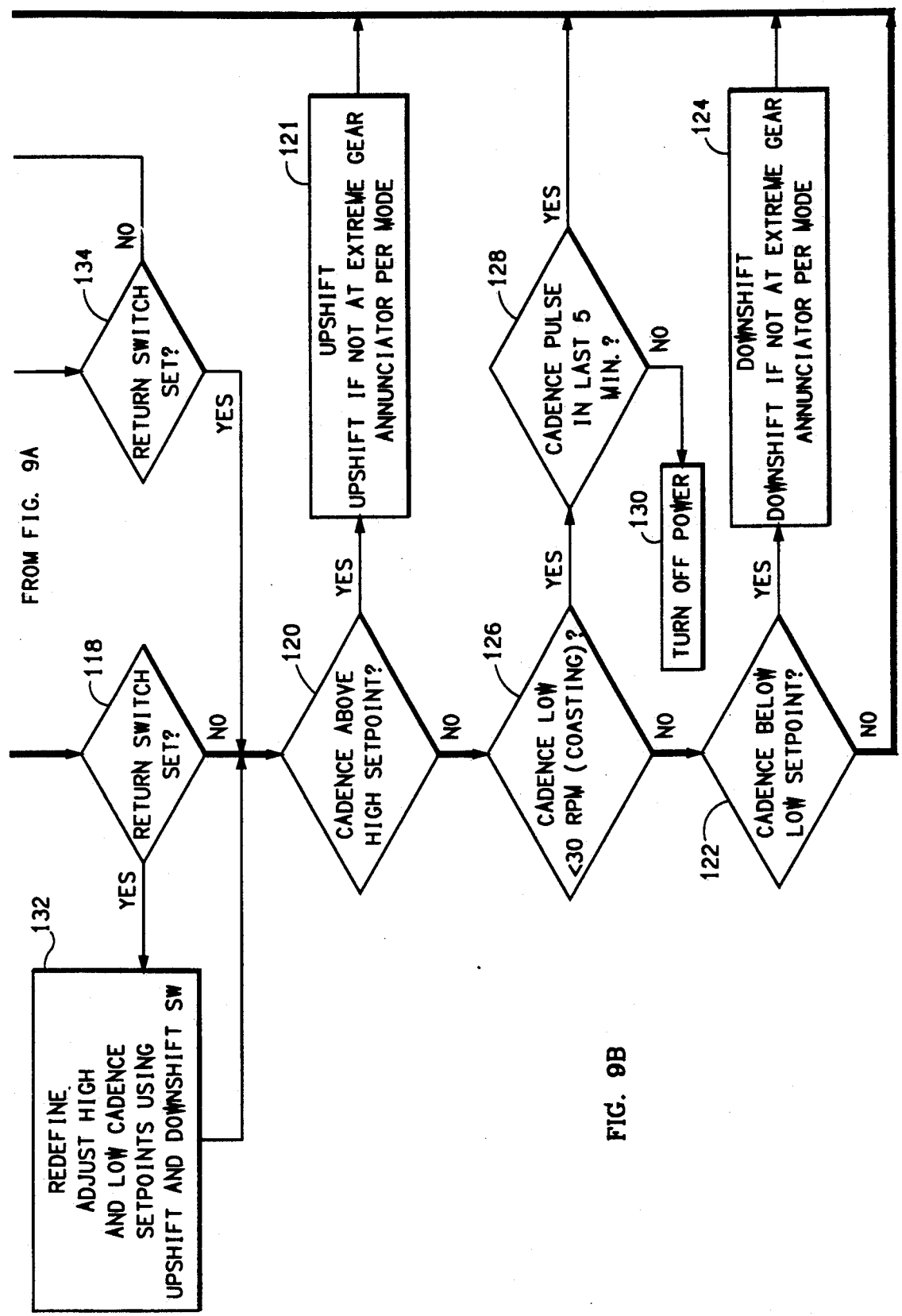
Figure 10A:
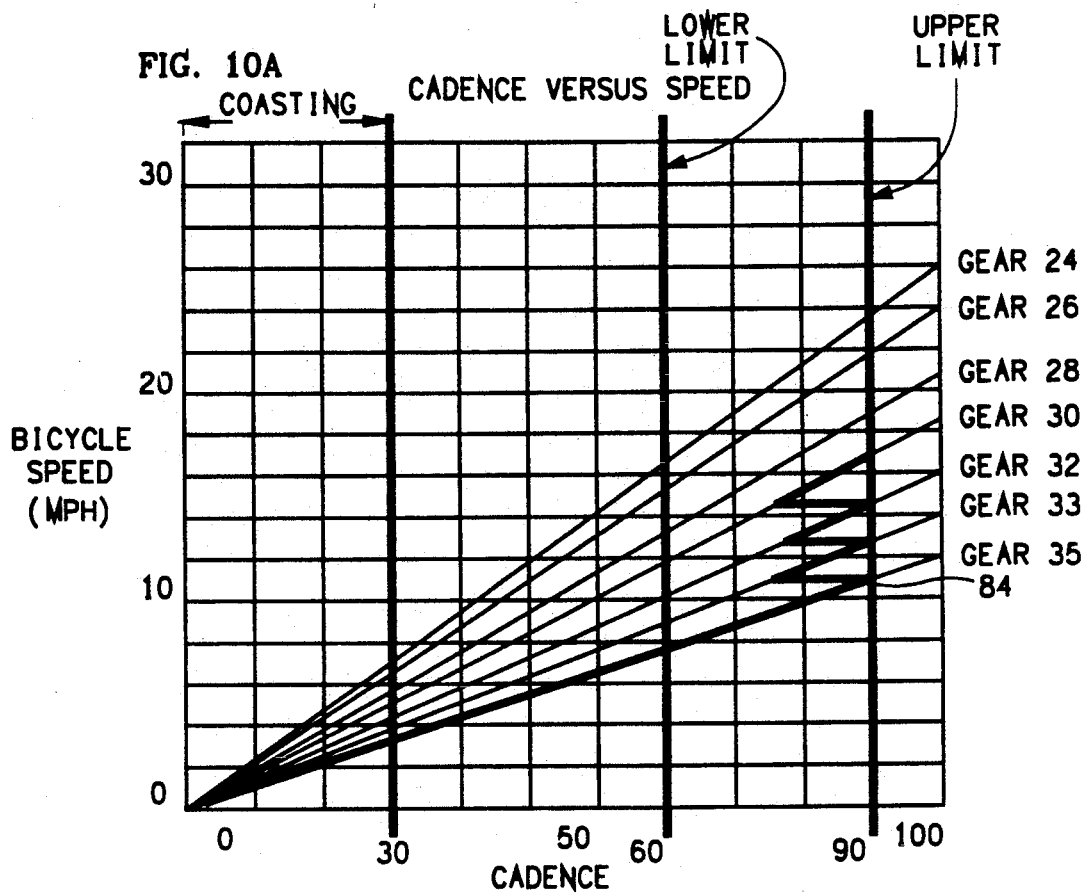
Figure 10B:
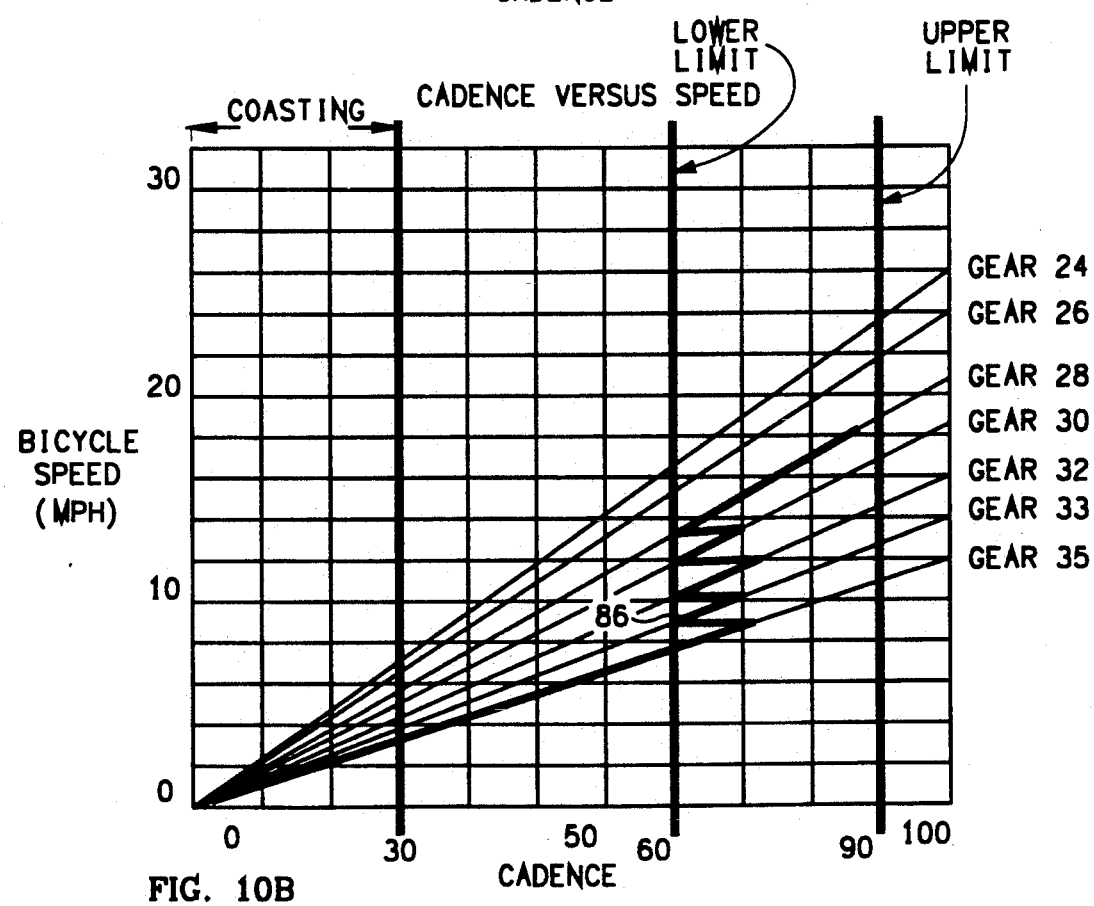

FIGS. 9A and 9B constitute a flow chart illustrating the sequence of operations in the system constituting this invention;

FIGS. 10A and 10B are diagrams schematically illustrating the operation of the system of this invention in adjusting the selection of individual gears on the rear wheel of the bicycle shown in FIG. 1 when the sprocket speed varies at progressive instants of time.

In one embodiment of the invention, a bicycle generally indicated at 10 (FIG. 1) is provided. In its basic aspects, the bicycle 10 includes features well known in the art. For example, the bicycle 10 includes a frame 12 and also includes a seat 14, a front wheel 16 and a rear wheel 18, all of which are attached to the frame in a conventional manner. The bicycle also includes a sprocket 20 coupled to a pedal crank 23 and pedals 21 extending from opposite sides of the sprocket for rotating the sprocket in accordance with the operation of the pedals.

Figure 7:
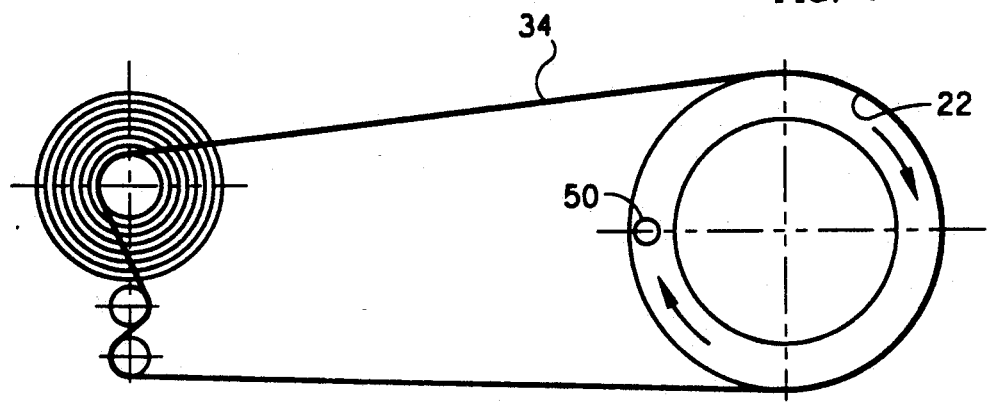
FIG. 7 is a fragmentary side elevational view schematically illustrating the sprocket, the gear on the sprocket, the gears on the rear wheel and the gear chain disposed in a closed loop on the sprocket gear and an individual one of the gears on the rear wheel.

The sprocket 20 has at least one gear 22 (FIG. 7) which is rotatable with the sprocket. Some of the bicycles within the scope of this invention may have more than one gear on the sprocket 20 but this is not shown in the drawings. For such a bicycle with multiple gears on the sprocket, the shifting of the chain to a different gear by either manual or powered actuator momentarily changes the cyclist's pedal speed or cadence. If the new cadence is above the higher limit or below the lower limit, the microprocessor will cause the derailleur to shift until the cadence is restored between the high limit and the low limit.

A plurality of gears 24, 26, 28, 30, 32, 33 and 35 (FIG. 2-3) are mounted on the rear wheel 18 and a gear chain 34 (FIGS. 1, 2, 3 and 7) is disposed in a closed loop around one of the gears 24, 26, 28, 30, 32, 33 and 35 and the sprocket gear 22. Although seven (7) gears are shown as being mounted on the rear wheel 18, it will be appreciated that any number of gears may be mounted on the rear wheel without departing from the scope of the invention. For example, gear assemblies with five (5) gears, with six (6) gears, with seven (7) gears and with eight (8) gears on the rear wheel 18 are common.

The selection of the individual one of the gears 24-26, 28, 30, 32, 33 and 35 at any instant is provided by the operation of a derailleur mechanism generally indicated at 38 FIGS. 3-6). The derailleur mechanism 38 is disposed in the form of a parallelogram in which two (2) pins 42 and 44 are fixed and in which two (2) pins 39 and 40 can be variably disposed. The operation of the derailleur mechanism 38 is controlled by the adjustment in the position of a pin 46.

As will be seen, when the pin 46 is adjusted to the position shown in FIG. 4, the pins 39 and 40 are adjusted in position relative to the fixed pins 42 and 44 so that the gear 26 is coupled to the gear chain 34 as shown in FIG. 2. Since the gear 26 has a low number of teeth, the rear wheel 18 is driven at a relatively high speed by the rotation of the sprocket 20. In like manner, when the pin 46 is adjusted to the position shown in FIG. 5, the pins 39 and 40 are moved to the position shown in FIG. 5. This causes the gear 33 to be driven by the gear chain 34 and the rear wheel 18 of the bicycle 10 to rotate at a relatively low speed in accordance with the rotation of the sprocket 20. It will be appreciated that other gear mechanisms than the derailleur mechanism 38 may be disposed on the rear wheel 18 of the bicycle 10 without departing from the scope of this invention.

Components are disposed on the sprocket 20 to detect the speed of rotation of the sprocket at each instant. In the embodiment of the invention shown in the drawings, electromagnetic components are used. For example, permanent magnets 50 (FIG. 6) may be disposed on ribs 52 (FIG. 1) of the sprocket 20, one permanent magnet on each rib. In the embodiment shown in the drawings, three (3) ribs 52 are provided on the sprocket 20 although any other number of ribs may be provided on the sprocket. Furthermore, it will be appreciated that only one (1) permanent magnet 5B may be provided on the sprocket. An electromagnetic detector 54 (FIG. 6) may be disposed in a fixed position on the frame 12 to produce a signal every time that one of the permanent magnets 52 moves past the detector. It will be appreciated that other types of detecting arrangements may be used instead of the electromagnetic detecting arrangement described above. These may include optical and electrically capacitive arrangements.

A suitable motor such as a stepping motor 56 (FIGS. 4 and 5) may be disposed on a motor mount 64 at a position near the gears 24, 26, 28, 30, 32, 33 and 35. The stepping motor 56 may rotate a lead screw nut internal to the motor. The nut in turn drives a lead screw 58 which positions the pin 46. As the lead screw 58 is positioned by the motor 56, it causes the lead screw to advance or recede, depending upon the direction of rotation of the stepping motor 56. The lead screw 58 is pivotable as at 46 relative to the derailleur mechanism 38. As the lead screw 58 advances or recedes, it pivots the derailleur mechanism 38 between the positions shown in FIGS. 4 and 5 so as to move the gear chain 34 into coupled relationship with individual ones of the gears 24, 26, 28, 30, 32, 33 and 35.

Since the derailleur should position accurately and repeatedly at multiple intermediate positions, a method to accurately control the system should be employed. This is accomplished by using a microprocessor 70 (FIG. 8) to count the number of steps or electronic pulses applied to the stepper motor. Each step increments the lead screw approximately one thousandth (0.001) of an inch. Approximately eighty (80) steps are provided to shift one gear spacing and this can be done in less than one second. There may be a uniform number of steps between each gear selection or the microprocessor 70 could store in memory a different number of steps as necessary for each gear position.

The speed of rotation of the sprocket 20 is determined in the microprocessor 70 (FIG. 8) by counting in a counter a particular number of pulses produced in the detector 54 and by measuring the time required to count such particular number of pulses. The microprocessor 70 then determines the average speed of the sprocket 20 from such count and such time. For example, if the particular count is nine (9) (corresponding to three (3) complete revolutions of the sprocket) and such count occurs in four (4) seconds, the number of sprocket revolutions per minute as determined by the microprocessor will be forty five (45).

Different cyclists may prefer a different sensitivity or responsiveness of the microprocessor 70 to cadence input data. For example racers, with their constant pedaling effort, may desire shifting decisions based on the period of time for a single revolution of the pedals after a previous shift while more leisurely cyclists may prefer decisions based on up to five (5) pedal revolutions. This sensitivity adjustment can be made by setting the number of full and partial sprocket revolutions counted and averaged in order to calculate cadence.

The microprocessor 70 is programmed to ignore sprocket speed determinations during a gear shift since the sprocket speed is changing. When the gear shift is completed as determined by counting the stepper motor pulses, time periods for all sprocket ribs are determined and the proper number of time periods are averaged depending on the sensitivity setting. The average cadence is then updated for each additional sprocket spoke period. The microprocessor 70 may be disposed at a convenient place on a handle bar 72 (FIG. 1) on the bicycle frame 12. A numerical display or indicator 74 (FIG. 8) may also be disposed on the handlebar 72 to indicate the current cadence value.

Generally, the cyclist desires to pedal the bike at a rate which is comfortable to him. This rate preferably remains within the same particular limits regardless of which individual one of the gears 24, 26, 28, 30, 32, 33 and 35 is coupled to the gear chain 34 at any instant. For example, the upper limit of the rotational speed of the sprocket 20 may be approximately ninety (90) sprocket revolutions per minute as indicated at 84 in FIG. 10A and the lower limit may be approximately sixty (60) revolutions per minute as indicated at 86 in FIG. 10B.

Under such circumstances, when the sprocket speed increases to approximately ninety (90) sprocket revolutions per minute as indicated at 84 in FIG. 10A, the microprocessor 70 will operate to shift the gears to a higher gear so that the rear wheel rotates at an increased speed. For example, the derailleur mechanism 38 may be operated to replace the coupling of the gear 35 with the gear chain 34 by the coupling of the gear 33 with the gear chain when the sprocket speed reaches ninety (90) revolutions per minute as indicated at 84 in FIG. 10A.

Similarly, when the rotational speed of the sprocket 20 decreases to approximately sixty (60) revolutions per minute as indicated at 86 in FIG. 10B, the derailleur mechanism 38 will be operated to change the gear ratio. For example, the derailleur mechanism 38 may be operated to change from a coupling of the gear 33 to the gear chain 34 to a coupling of the gear 35 to the gear chain when the sprocket speed decreases to approximately sixty (60) revolutions per minute as indicated at 86 in FIG. 10B.

In FIGS. 10A and 10B, the cadence (or sprocket speed) is indicated at the horizontal axis and the speed of the bicycle 20 is indicated at the vertical axis. As will be appreciated, FIGS. 10A and 10B are only schematic since the bicycle speed for any gear ratio is dependent upon the relative number of teeth on the gear on the sprocket 20 and on each of the gears 24, 26, 28, 30, 32, 33 and 35.

FIGS. 10A and 10B show the adjustable lower and upper sprocket speed limits and the coasting limit is shown at 30 RPM of the sprocket 20. Operation of the sprocket 20 with cadence below the coasting limit will not automatically change gears although manual operation will change gears independent of cadence.

A cyclist may wish to adapt the upper and lower limits to different levels at different times to accommodate his own physical characteristics. For example, as the day progresses and the cyclist tires from a long bicycle trip, the cyclist may wish to decrease the upper and lower limits controlling the shift of gears in the derailleur mechanism 38. In the specific examples in the previous paragraphs, the cyclist may wish to decrease the upper limit of the sprocket speed from ninety (90) revolutions per minute to eighty seven (87) per minute and to decrease the lower limit from sixty (60) sprocket revolutions per minute to fifty seven (57) per minute.

A pair of switches 90 and 92 mounted on the handlebar 72 (FIG. 8) are provided for this purpose. The switch 90 (the up switch) is provided to increase the upper and lower limits and/or the switch 92 (the down switch) is provided to decrease the upper and/or lower limits. These switches are mounted in a position convenient to the right or left hand. In addition, multiple pairs of switches 90 and 92 with a parallel electrical connection to other switches 90 and 92 may be positioned as convenient for alternate hand positions.

To increase the upper limit of the sprocket speed, the switches 90 and 92 are first operated together within a first particular time limit such as approximately one tenth (0.10) of one second. The up switch 90 is then operated momentarily to increase the upper limit by an increment and the new value is displayed on the numeric display 74. Every operation of the switch 90 increases the upper limit by another increment. Alternatively, the continued operation of the up switch for time increments such as approximately a half (0.50) second may cause the upper limit to increase by one (1) integer for each such time increment. Usually all of the operations of the switch 90 occur within a particular time limit such as approximately ten (10) seconds. If it is desired to decrease the upper limit, the switch 92 is operated after operation of the switches 90 and 92 together within the first particular time limit such as approximately one tenth (0.10) of one second. Each separate operation of the switch 92, or each continued operation of the switch 92 in time increments such as approximately a half (0.50) second will cause the upper limit to decrease by one (1) decrement.

To change the lower limit of the sprocket speed, the switches 90 and 92 are again operated together within the first particular time period such as approximately one tenth (0.10) of one second. When it is desired to increase the lower limit, the switch 90 is then operated, as described in the previous paragraph, within the time period such as approximately ten (10) seconds after the operation of the switches 90 and 92 together within the first particular time period such as approximately one tenth (0.10) of one second). For a decrease in the lower limit, the switch 92 is operated in a similar manner within the time period such as approximately ten (10) seconds after the sequential operation of the switches 90 and 92.

During adjustments to the upper and lower limits as described in the previous two paragraphs, the microprocessor 70 will not alter the gear selection. To allow the microprocessor 70 to use the new upper and lower limits, the switches 90 and 92 are again operated together within the first particular time period such as approximately one tenth (0.10) of a second and microprocessor control returns to automatic mode.

One advantage of the sequences discussed above to change the upper and lower limits is that only two (2) conveniently mounted switches are needed to change the upper limit upwardly or downwardly or the lower limit upwardly or downwardly. It will be appreciated, however, that other patterns may be used to accomplish the same purposes without departing from the scope of the invention. For example, four (4) separate switches may be provided, two (2) to independently control increments and decrements in the upper limit and the other two (2) to independently control increments and decrements in the lower limit.

There may be times that the cyclist may wish the bicycle 10 to coast. For example, the cyclist may wish the bicycle 10 to coast down a hill. At such times, the rider may wish not to have the gear ratio in the derailleur 38 changed. In this way, the bicycle will be in the same gear ratio at the bottom of the hill as it is at the top of the hill. This is accomplished in the embodiment of this invention by the microprocessor 70. When the sprocket 20 is rotating at a particular speed less than a pre-set value such as thirty (30) revolutions per minute, the microprocessor will not operate to select a different gear. This pre-set value may be changed as by operating a switch 94 (FIG. 8) to adjust the pre-set value upwardly and as by a switch 96 to adjust the pre-set value downwardly. The switches 94 and 96 may be disposed in a panel 98 on the handlebar 72. It will be appreciated that the switches 94 and 96 may be eliminated and the pre-set value may be maintained at a fixed value. It will also be appreciated that the pre-set value for coasting without changing the gear ratio may be re-set by other arrangements than the switches 94 and 96.

An audio annunciator 97 (FIG. 8) may be provided to indicate when a gear shift in the derailleur 38 is to take place. The annunciator 97 may emit a sound such as a beep every time that a gear shift upwardly or downwardly in the derailleur 30 is to occur. This will alert the cyclist that a gear change is about to occur.

FIGS. 9A and 9B provide a flow chart of the operation of the system shown in FIGS. 1-8 and described above. As an initial step, the power is turned on from a power supply 99 (FIG. 8).

The operation of the system described above may be changed from an automatic mode as described above to a manual mode. In the manual mode, the microprocessor 70 is switched from an automatic operation to an operation under the control of the cyclist. In the manual mode, the operation of the switch 90, without a previous operation of the switches 90 and 92 together within a particular time limit such as approximately one tenth (0.10) of one second, will cause the gear ratio in the derailleur mechanism 38 to be adjusted upwardly. Similarly, the operation of the switch 92 under like circumstances will cause the gear ratio in the derailleur mechanism 38 to be adjusted downwardly.

In the flow chart shown in FIGS. 9A and 9B, the basic operation of the system in the automatic mode is shown in dark lines and auxiliary operations of the system are shown in light lines. When power is applied to the system from the power supply 99 (FIG. 8) as indicated at 107 in FIG. 9A, the system is initialized as at 109 to assure its proper operation. For example, the most recent values for the upper and lower cadence limits, which were stored external to the microprocessor during the power off condition, are loaded into the microprocessor.

When a set-up switch 112 is operated, various set-up functions can be performed. These are functions which are changed relatively infrequently. For example, the system can be adjusted to conform to the number of gears (e.g. 5, 6, 7 or 8) in the derailleur mechanism 38. The annunciator 97 (FIG. 8) operation can be modified to provide different functions in automatic or manual operation. The sensitivity in measuring the cadence (the sprocket speed) can also be adjusted by varying the number of counts that are made by the detector 54 to reach a full count in the counter for use by the microprocessor 70 in determining the sprocket speed. The cadence is displayed by a numeric display 74 at periodic intervals such as every two (2) seconds, as indicated at 114 in FIG. 9A. The checking of the set-up functions such as the number of gears in the derailleur mechanism 38, the operation of the annunciator 98 and the sensitivity of the full count in the counter are indicated at 115 in FIG. 9A.

The next step in the sequence is to determine if one of the switches 90 and 92 has been operated without an operation of the other switch within the particular period such as approximately one tenth (0.10) of one second. When the switch 90 is operated, the microprocessor 70 shifts the gear ratio in the derailleur mechanism 38 upwardly. This causes the bicycle 10 to move at an increased speed in accordance with the rotation of the sprocket 20 within a particular range of speeds (e.g. 60-90 rpm). A closing of the switch 90 for an extended period of time will cause the derailleur mechanism to shift upwardly through several gear ratios until the switch 90 is released or the derailleur reaches its mechanical travel stop.

When the switch 92 is operated, the microprocessor 70 shifts the gear ratio in the derailleur mechanism 38 downwardly. This causes the bicycle 10 to move at a decreased speed in accordance with the rotation of the sprocket 20 at a constant speed. When the switch 92 is closed for an extended period of time, the gear ratio in the derailleur mechanism 38 shifts downwardly through several gear ratios.

The operation of the switch 90 or the switch 92 in the manner discussed in the previous paragraphs is considered as the manual mode of operation. This is indicated at 116 in FIG. 9A. For example, a cyclist may be approaching a red traffic light. The cyclist may accordingly wish to shift the gear ratio in the derailleur mechanism 38 manually downwardly so that the derailleur mechanism will have a low gear ratio when the cyclist starts to pedal the bicycle from a standstill position.

Manual mode of operation is selected when the cyclist wishes to temporarily override the automatic operation for any reason. Once in manual mode, the microprocessor will remain in manual mode until the switches 90 and 92 are both operated together within a particular time period such as approximately one tenth (0.10) of a second. This is indicated at 134 in FIG. 9B.

When the switches 90 and 92 are not set for manual operation, a determination is made as to whether the cyclist has operated the switches 90 and 92 in sequence within a particular time period such as a tenth (0.10) of a second. This is indicated at 118 in FIG. 9B. As previously indicated, the upper or lower limits of the sprocket speed have been preset. Under such circumstances, when the rotational speed of the sprocket 20 increases above the upper limit such as approximately ninety (90) revolutions per minute (as indicated at 120 in FIG. 9B), the gear ratio in the derailleur mechanism 38 is shifted upwardly by the microprocessor 70 if the gear chain 34 is not already engaging the gear 24 in the derailleur mechanism 38. This is indicated at 121 in FIG. 9B. In like manner, the gear ratio in the derailleur mechanism 38 is shifted downwardly when the cadence in the sprocket 20 falls below the lower limit such as sixty (60) revolutions per minute, as indicated at 122 in FIG. 9B. This downward shift is indicated at 124 in FIG. 9B. It will be appreciated that the gear ratio will not be shifted downwardly in this manner if the gear chain 34 is already engaging the gear 35 in the derailleur mechanism 38. In this way, the sprocket cadence is maintained between the upper and lower limits.

It may sometimes happen that the bicycle 10 is coasting as when the bicycle is moving downhill. Under such circumstances, the bicyclist may not wish to change gears during the downhill movement. The coasting of the bicycle 10 is determined as at 126 in FIG. 9B. For a low cadence (such as thirty (30) sprocket revolutions per minute) which is considerably below the lower limit (such as sixty (60) revolutions per minute), no change in the gear ratio is made in the derailleur mechanism 38 during each coasting. However, if no sprocket movement is detected for an extended period of time such as approximately five (5) minutes as indicated at 128 in FIG. 9B, the power to the system is discontinued. This is indicated at 130 in FIG. 9B.

At such times as the switches 90 and 92 have been operated together within the particular period of time such as approximately one tenth (0.10) of a second, the upper and lower limits for the sprocket speed can be adjusted. This is indicated at 132 in FIG. 9B. At such times, the operation of the switch 90 causes the upper limit of the high cadence setpoint to increase, thereby increasing the sprocket speed necessary to cause an automatic up shift. Similarly, the upper limit of the high cadence setpoint is decreased when the switch 92 is operated at such times. The same process is repeated for adjusting upwardly and downwardly the lower limit of the sprocket speed. The most recent upper and lower limits for the sprocket system are stored by the electronic system even after the power has been turned off. These limits are then recalled and become the starting limits when power is restored.

The system described above has certain important advantages. It adjusts gear ratios in the gears on the rear wheels in accordance with the sprocket speed. When the speed of the sprocket 20 increases above the upper limit (e.g. 90 rpm), the gear ratio is increased as indicated in FIG. 9B. Similarly, upon each occurrence of the sprocket speed below the lower limit (e.g. 60 rpm), the gear ratio of the gears on the rear wheel is decreased as indicated in FIG. 9B. In this way, the sprocket speed is always maintained within the upper and lower limits.

The system described above also has other important advantages. The system provides for an adjustment of the upper and lower limits of sprocket speed to accommodate the needs or desires of each individual cyclist. The upper and lower limits are individually adjustable to provide variations in the average cadence desired and variations in the range between the low limit and the high limit. The system also provides for a retention of the previously set gear ratios while the bicycle is coasting or while power is turned off. This facilitates a smooth operation of the bicycle when the bicycle reaches a level grade after coasting downhill. If the sprocket speed stops for an extended period of time, the power to the microprocessor is discontinued to preserve battery life.

There are also other important advantages to the system of this invention. The sensitivity of response of the system can be adjusted by adjusting the number of sprocket revolutions (or sprocket ribs) which are counted to determine the cadence (the speed of revolution) of the sprocket. The system can also be quickly converted to a manual mode when the cyclist desires the adjustment in the ratio of the gears on the rear wheel to be under the control of the cyclist rather than under the control of the microprocessor 70. In the manual mode, the microprocessor 70 operates to provide for a shifting of the gear ratios in the derailleur mechanism 38 in accordance with the individual operation of the switches 90 and 92 by the cyclist.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination,
   a bicycle having front and rear wheels and a sprocket and a pedal crank for driving the sprocket and a gear chain in engagement with the sprocket and a plurality of gears on the rear wheel, the chain being adjustable in position relative to the gears on the rear wheel to provide an engagement between individual ones of the gears and the gear chain,
   means operative in an automatic mode and operatively coupled only to the sprocket and the frame for determining the speed of the sprocket at each instance, and
   means operative in the automatic mode and responsive at each instance only to the determination of the sprocket speed for adjusting the position of the gear chain relative to the gears on the rear wheel to maintain the speed of the sprocket within particular limits.

2. In a combination as set forth in claim 1,
   means operative in the automatic mode for adjusting the position of the gear chain relative to the gears on the rear wheel to obtain the coupling of a higher gear to the gear chain when the speed of the sprocket is determined to be above a first particular value.

3. In a combination as set forth in claim 1,
   means operative in the automatic mode for adjusting the position of the gear chain relative to the gears on the rear wheel to obtain the coupling of a lower gear to the gear chain when the speed of the sprocket is determined to be below a particular value.

4. In combination,
   a bicycle having front and rear wheels and a sprocket and a pedal crank for driving the sprocket and a gear chain in engagement with the sprocket and a plurality of gears on the rear wheel, the chain being adjustable in position relative to the gears on the rear wheel to provide an engagement between individual ones of the gears and the gear chain,
   means operative in an automatic mode and operatively coupled to the sprocket for determining the speed of the sprocket at each instance, and
   means operative in the automatic mode and responsive at each instance to the determination of the sprocket speed for adjusting the position of the gear chain relative to the gears on the rear wheel to maintain the speed of the sprocket within particular limits,
   means operative in the automatic mode for adjusting the position of the gear chain relative to the gears on the rear wheel to obtain the coupling of a higher gear to the gear chain when the speed of the sprocket is determined to be above a first particular value,
   means operative in the automatic mode for adjusting the position of the gear chain relative to the gears on the rear wheel to obtain the coupling of a lower gear to the gear chain when the speed of the sprocket is determined to be below a particular value,
   means operative in the automatic mode for adjusting the first particular value to a first new value, and
   means operative in the automatic mode for adjusting the second particular value to a second new value.

5. In combination,
   a bicycle having front and rear wheels and a pedal crank and a sprocket coupled to the pedal crank and a gear on the sprocket and a plurality of gears on the rear wheel and a chain for coupling individual ones of the gears on the rear wheel to the gear on the sprocket,
   means operative in the automatic mode and operatively coupled to the sprocket for determining the speed of the sprocket at each instance,
   means operative in the automatic mode and responsive to the speed of the sprocket at each instance for adjusting the position of the gear chain relative to the gears on the rear wheel to select individual ones of the gears on the rear wheel for coupling to the gear chain to maintain the speed of the sprocket within particular limits, and
   means operative in the automatic mode and responsive to the speed of the sprocket below a particular value lower than the particular limits for maintaining the coupling between the gear on the sprocket and the selected one of the gears on the rear wheel without any adjustment.

6. In a combination as set forth in claim 5,
   means operative in the automatic mode and responsive to the movement of the sprocket at a first particular limit of the sprocket speed for adjusting the coupling of the gear chain relative to the gears on the rear wheel to reduce the speed of the sprocket below the first particular limit, and
   means operative in the automatic mode and responsive to the movement of the sprocket at a second particular limit of the sprocket speed for adjusting the coupling of the chain relative to the gears on the rear wheel to increase the speed of the sprocket above the second particular limit,
   the second particular limit being below the first particular limit.

7. In a combination as set forth in claims 5 or 6,
   means operative in the automatic mode for adjusting the first particular limit of the sprocket speed at which the gear chain is adjusted in position relative to the gears on the rear wheel to reduce the sprocket speed, and
   means operative in the automatic mode for adjusting the second particular limit of the sprocket speed at which the gear chain is adjusted in position relative to the gears on the rear wheel to increase the sprocket speed.

8. In a combination as set forth in claim 7,
   means operative in the automatic mode for adjusting the rotational angle through which the sprocket rotates to obtain a determination of the sprocket speed.

9. In combination, a bicycle having front and rear wheels and having a pedal crank and a sprocket coupled to the pedal crank and having gears coupled to the rear wheel and having a gear coupled to the sprocket and having a gear chain extending around the gear on the sprocket and individual ones of the gears on the rear wheel, means operative in an automatic mode and operatively coupled to the sprocket for determining the speed of rotation of the sprocket at each instance, means operative in the automatic mode for adjusting the gear chain relative to the gears on the rear wheel in accordance with the determination of the speed of rotation of the sprocket to adjust the ratio of the gear chain coupled to the gear on the rear wheel relative to the gear on the sprocket, and means operative in the automatic mode for adjusting the angle though which the sprocket rotates to obtain each determination of the speed of rotation of the sprocket.

10. In a combination as set forth in claim 9 wherein the sprocket has a plurality of angularly spaced ribs and wherein the speed-determining means counts a particular number of the ribs on the sprocket in the automatic mode and determines the period of time for producing a particular count and wherein the angle-adjusting means adjusts the number of sprocket ribs rotated past a particular position in the automatic mode to obtain each particular count.

11. In a combination as set forth in claim 9, means operative in the automatic mode for adjusting the chain relative to the gears on the rear wheel upon each occurrence of a first particular speed of the sprocket rotation to increase the gear ratio between the gear on the rear wheel and the gear coupled to the sprocket; and means for adjusting the chain relative to the gears on the rear wheel upon each occurrence of a second particular speed of the sprocket rotation to decrease the gear ratio between the gear on the rear wheel and the gear coupled to the sprocket, the second particular speed being less than the first particular speed.

12. In a combination as set forth in claim 11, means operative in the automatic mode for adjusting the first and second particular speeds while the pedal crank is being rotated.

13. In combination, a bicycle having front and rear wheels and having a pedal crank and a sprocket coupled to the pedal crank and having gears coupled to the rear wheel and having a gear coupled to the pedal crank and having a gear chain extending around the gear on the pedal crank and individual ones of the gears on the rear wheel, first means operative in an automatic mode and operatively coupled to the sprocket for determining the speed of the sprocket at each instance, second means operative in the automatic mode for adjusting the coupling of the gear chain relative to the individual gears on the rear wheel in accordance with the determination of the sprocket speed, third means operative in the automatic mode for disabling the gear adjusting means for sprocket speeds of rotation below a first particular value to maintain, while coasting, the gear ratios set before the beginning of the coating, fourth means operative in the automatic mode for enabling the operation of the first, second and third means, and means operative in the automatic mode for discontinuing the enabling by the fourth means of the operation of the first, second and third means upon the occurrence of a zero sprocket speed for a time greater than a particular period of time.

14. In a combination as set forth in claim 13, means operative in the automatic mode for adjusting the gear chain relative to the gears on the rear wheel, upon the determination of a sprocket speed greater than a second particular value, to increase the gear ratio of the gear on the rear wheel relative to the gear on the pedal, and means operative in the automatic mode for adjusting the gear chain relative to the gears on the rear wheel, upon the determination of a sprocket speed lower than a third particular value, to decrease the gear ratio of the gear on the rear wheel relative to the gear on the pedal crank, the second particular value being greater than the first and third particular values and the third particular value being greater than the second particular value.

15. In a combination as set forth in claim 14, means operative in the automatic mode for changing the second particular value during the rotation of the pedal crank, and means operative in the automatic mode for changing the third particular value during the rotation of the pedal crank.

16. In a combination as set forth in claim 13, means for converting the adjustment of the gear chain relative to the gears on the rear wheel to a manual operation, and means for preventing an adjustment of the second and third particular values during the manual adjustment of the gear chain relative to the gears on the rear wheel.

17. In combination, a bicycle having front and rear wheels and having a sprocket and a pedal crank operatively coupled to the sprocket for driving the sprocket and having a gear on the sprocket and having a plurality of gears on the rear wheel and having a gear chain operatively coupled to the gear on the sprocket and individual ones of the gears on the rear wheel, the gear chain being adjustable relative to the gears on the rear wheel to provide for the coupling of the gear chain to the individual ones of the gears on the rear wheel, first means operative in an automatic mode for providing for an adjustment of the gear chain relative to the gears on the rear wheel upon a rotary speed of the sprocket above a first particular value to increase the ratio between the individual one of the gears on the rear wheel relative to the gear on the sprocket and to decrease the sprocket speed, and second means operative in the automatic mode for adjusting the first particular value while the first means is operative to provide the adjustment of the gear chain relative to the gears on the rear wheel.

18. In a combination as set forth in claim 17, third means operative in the automatic mode and responsive to a rotary speed of the sprocket below a second particular value for preventing any adjustment of the gear chain relative to the gears on the rear wheel, the second particular value being lower than the first particular value.

19. In a combination as set forth in claim 18, fourth means operative in the automatic mode and responsive to a zero rotary speed of the sprocket for longer than a particular period for disabling adjustments by the first means of the gear chain relative to the gears on the rear wheel and adjustments by the second means of the sprocket speed.

20. In a combination as set forth in claim 17, means for discontinuing the operation of the first and second means to provide for a manual adjustment of the gears on the rear wheel.

21. In combination, a bicycle having front and rear wheels, a pedal crank, a sprocket coupled to the pedal crank, a gear coupled to the sprocket, a plurality of gears coupled to the rear wheel and a gear chain extending in a closed loop around the sprocket gear and an individual one of the gears on the rear wheel, first means operative in an automatic mode and operatively coupled to the sprocket for determining the rotary speed of the sprocket at each instance, second means operative in the automatic mode for adjusting the gear chain relative to the gears on the rear wheel in accordance with the rotary speed of the sprocket to maintain the sprocket speed within particular limits, and third means operative in the automatic mode for overriding the adjustment by the second means of the gear chain relative to the gears on the rear wheel in the automatic mode in accordance with the sprocket speed to obtain a manual adjustment of the gear chain relative to the gears on the rear wheel.

22. In a combination as set forth in claim 21, means operative in the automatic mode for adjusting the angle of rotation of the sprocket during which each determination of the rotary speed of the sprocket is made to obtain the adjustment of the gear chain relative to the gears on the rear wheel in accordance with the sprocket speed.

23. In a combination as set forth in claim 22, processing means, the second means being operatively coupled to the processing means in the automatic mode for adjusting the gear chain relative to the gears on the rear wheel in accordance with the rotary speed of the sprocket to maintain the speed of the sprocket within the particular limits, the third means being operatively coupled to the processing means for overriding the second means and for obtaining a manual adjustment of the gear chain relative to the gears on the rear wheel.

24. In a combination as set forth in claim 21, means operative in the automatic mode for preventing any adjustment of the gear chain relative to the gears on the rear wheel from being made during the rotary movement of the sprocket wheel at a speed below a second particular limit, the second particular limit being lower than the particular limits.

25. In a combination as set forth in claim 24, power supply means, the first and second means receiving power from the power supply means, the first and second means being operative in the automatic mode during the supply of power to the first and second means from the power supply means, and means operative in the automatic mode for interrupting the supply of power to the first and second means in the automatic mode when the rotary movement of the sprocket is stopped for greater than a particular period of time.

26. In combination, a bicycle having front and rear wheels, a pedal crank, a sprocket coupled to the pedal crank, a gear coupled to the sprocket, a plurality of gears coupled to the rear wheel and a gear chain extending in a closed loop around the sprocket gear and an individual one of the gears on the rear wheel and adjustable relative to the gears on the rear wheel, first means operative in an automatic mode and operatively coupled to the sprocket for determining the sprocket speed at each instance, second means operative in the automatic mode for adjusting the gear chain relative to the gears on the rear wheel in accordance with the sprocket speed to maintain the sprocket speed between upper and lower limits, first and second switches for respectively adjusting the upper and lower limits, third means responsive in the automatic mode to a first sequence of operation of the first and second switches within a particular time limit for adjusting the upper limit, and fourth means responsive in the automatic mode to a second sequence of operation of the first and second switches within the particular time limit for adjusting the lower limit.

27. In a combination as set forth in claim 26, fifth means responsive to an operation of the first switch, without a simultaneous operation of the second switch, to discontinue the operation of the second and third means and to adjust the gear chain relative to the gears on the rear wheel in a manual mode for increasing the gear ratio between the gears on the rear wheel and the gear on the sprocket, and means responsive to an operation of the second switch, without a simultaneous operation of the first switch, to adjust the gear chain relative to the gears on the rear wheel in the manual mode for decreasing the gear ratio between the gears on the rear wheel and the gear on the sprocket.

28. In a combination as set forth in claims 26 or 27, means operative in the automatic mode for preventing the gear chain from being adjusted relative to the gears on the rear wheel when the sprocket speed is below a particular value, the particular value of the sprocket speed being lower than the lower limit.

29. In a combination as set forth in claim 28, means operative in the automatic mode for discontinuing operation in the automatic mode when the sprocket is stopped for greater than a particular period of time.

30. In combination, a bicycle having front and rear wheels, a pedal crank, a sprocket coupled to the pedal crank, a gear coupled to the sprocket, a plurality of gears coupled to the rear wheel and a gear chain extending in a closed loop around the sprocket gear and an individual one of the gears on the rear wheel and adjustable relative to the gears on the rear wheel, first means operative in an automatic mode for adjusting the position of the sprocket chain relative to the gears on the rear wheel when the sprocket speed is above an upper limit or below a lower limit, first and second actuatable switches, second means operative in the automatic mode for providing for an adjustment in the upper limit upon an actuation of the first and second switches in a first particular sequence within a first particular time limit and for providing for an adjustment in the lower limit upon an actuation of the first and second switches in a second particular sequence within the particular time limit, third means operative in the automatic mode and responsive to the actuation of the first and second switches in the first particular sequence within the first particular time limit for adjusting the upper limit, and fourth means operative in the automatic mode and responsive to the actuation of the first and second switches in the second particular sequence for adjusting the lower limit.

31. In a combination as set forth in claim 30, fifth means discontinuing the operation of the first, second, third and fourth means and for converting the adjustment of the gear chain relative to the gears on the rear wheel to a manual mode.

32. In a combination as set forth in claim 30, means operative in the automatic mode for adjusting the amount of angular rotation of the sprocket in determining the adjustment, if any, to be made in the gear chain relative to the gears on the rear wheel for sprocket speeds above the upper limit or below the lower limit.

33. In a combination as set forth in claim 30, the sprocket having a plurality of ribs, the means for adjusting the chain relative to the gears on the rear wheel being responsive to the automatic mode to the average rotary speed of the sprocket during the rotary movement of a particular number of ribs on the sprocket past a particular position, and means operative in the automatic mode for adjusting the number of ribs for movement past the particular position in determining the average rotary speed of the sprocket.

34. In a combination as set forth in claim 30, means operative in the automatic mode for preventing the gear chain from being adjusted relative to the gears on the rear wheel for rotary sprocket speeds less than a particular value, the particular value of the sprocket speed being less than the lower limit.

35. In combination, a bicycle having a frame, a front wheel, a rear wheel mounted on the frame, a pedal crank, a sprocket coupled to the pedal crank, a plurality of gears coupled to the rear wheel and a gear chain extending around the gear on the sprocket and an individual one of the gears on the rear wheel and adjustably positioned relative to the gears on the rear wheel, first means operative in an automatic mode and operatively coupled to the gear chain for adjusting the position of the gear chain relative to the gears on the rear wheel, second means operative in the automatic mode and operatively coupled only to the sprocket and the frame for determining the speed of the sprocket, and processing means responsive to the determination by the second means of the speed of the sprocket for operating the first means to adjust the position of the gear chain relative to the gears on the rear wheel for maintaining the speed of sprocket rotation within particular limits.

36. In combination, a bicycle having a frame, a front wheel and a rear wheel mounted on the frame, a sprocket coupled to the pedal crank, a plurality of gears coupled to the rear wheel and a gear chain extending around the gear on the sprocket and an individual one of the gears on the rear wheel, first means operatively coupled to the gear chain for adjusting the position of the gear chain relative to the gears on the rear wheel, second means operatively coupled to the sprocket for determining the speed of the sprocket, and processing means responsive to the speed of the sprocket for operating the first means to adjust the position of the gear chain relative to the gears on the rear wheel for maintaining the speed of sprocket rotation within particular limits third means manually operative to obtain an adjustment of the gear chain relative to the gears on the rear wheel, the third means being operatively coupled to the first means to provide for a manual operation of the first means in adjusting the position of the gear chain relative to the gears on the rear wheel in accordance with the manual operation of the third means, the processing means being responsive to the manual operation of the third means for discontinuing the operation of the processing means.

37. In combination, a bicycle having a frame, a front wheel and a rear wheel mounted on the frame, a sprocket coupled to the pedal crank, a plurality of gears coupled to the rear wheel and a gear chain extending around the gear on the sprocket and an individual one of the gears on the rear wheel, first means operatively coupled to the gear chain for adjusting the position of the gear chain relative to the gears on the rear wheel, second means operatively coupled to the sprocket and the frame for determining the speed of the sprocket, and processing means responsive to the speed of the sprocket for operating the first means to adjust the position of the gear chain relative to the gears on the rear wheel for maintaining the speed of sprocket rotation within particular limits, the third means being manually operative in a first mode to obtain an adjustment by the first means of the gear chain relative to the gears on the rear wheel, the third means being manually operative in a second mode to obtain an adjustment by the processing means of the particular limits of the sprocket speeds at which the gear chain is adjusted relative to the gears on the rear wheel.

38. In combination, a bicycle having front and rear wheels and a sprocket and a pedal crank for driving the sprocket and a gear chain in engagement with the sprocket and a plurality of gears on the rear wheel, the gear chain being adjustable in position relative to the gears on the rear wheel to provide an engagement between individual ones of the gears and the gear chain, first means operative in an automatic mode and operatively coupled to the sprocket for determining the speed of the sprocket at each instance, second means operative in the automatic mode and responsive at each instance to the determination of the sprocket speed for adjusting the position of the gear chain relative to the gears on the rear wheel to maintain the speed of the sprocket within upper and lower limits, third means including switching means operative in a first relationship in the automatic mode for adjusting the upper and lower limits, and fourth means including the switching means operative in a second relationship for converting the adjustment of the position of the gear chain relative to the gears on the rear wheel to a manual mode, and fifth means responsive to the operation of the fourth means including the switching means in the second relationship for adjusting the position of the gear chain relative to the gears on the rear wheel in accordance with such operation of the switching means.

39. In a combination as set forth in claim 38, the third means including the switching means operative in a third relationship following the operation of the switching means in the first relationship for changing one of the upper and lower limits in a first direction and including the switching means operative in a fourth relationship following the operation of the switching means in the first relationship for changing the one of the upper and lower limits in a second direction opposite to the first direction.

40. In a combination as set forth in claim 39, the third means including the switching means operative again in the third relationship following the operation of the switching means in the first relationship for changing the other one of the upper and lower limits in the first direction and operative again in the fourth relationship following the operation of the switching means in the first relationship for changing the other one of the upper and lower limits in the first and second operative directions.

41. In a combination as set forth in claim 38, the fifth means being responsive to the operation of the fourth means including the switching means in a first mode of the second relationship for adjusting the position of the gear chain relative to the gears on the rear wheel in a first direction and being responsive to the operation of the fourth means including the switching means in a second mode of the second relationship for adjusting the position of the gear chain relative to the gears on the rear wheel in a second direction opposite to the first direction.

42. In combination, a bicycle having front and rear wheels and a sprocket and a pedal crank for driving the sprocket and a gear chain in engagement with the sprocket and a plurality of gears on the rear wheel, the gear chain being adjustable in position relative to the gears on the rear wheel to provide an engagement between individual ones of the gears and the gear chain, signal producing means disposed on one of the sprocket and the frame, a sensor disposed on the other one of the sprocket and the frame and responsive only to the signal producing means to produce signals in accordance with the rotation of the sprocket relative to the frame, and first means operative in an automatic mode and responsive only to the signals from the sensor for adjusting the position of the gear chain relative to the gears on the rear wheel to maintain the speed of rotation of the sprocket within particular limits.

43. In a combination as set forth in claim 42, means operative in the automatic mode for initializing the operation of the bicycle with the upper and lower limits set at values corresponding to the upper and lower limits in the previous operation of the bicycle in the automatic mode.

44. In combination, a bicycle having front and rear wheels and a sprocket and a pedal crank for driving the sprocket and a gear chain in engagement with the sprocket and a plurality of gears on the rear wheel, the gear chain being adjustable in position relative to the gears on the rear wheel to provide an engagement between individual ones of the gears and the gear chain, a sensor disposed on an individual one of the sprocket and the frame, signal producing means disposed on the other one of the sprocket and the frame to energize the sensor in accordance with the rotation of the sprocket relative to the frame, and first means operative in an automatic mode and responsive only to the signals from the sensor for adjusting the position of the gear chain relative to the gears on the rear wheel to maintain the speed of rotation of the sprocket within particular limits, second means operative in the automatic mode for preventing any adjustment in the gear chain relative to the gears on the rear wheel when the sprocket is at a speed lower than a particular speed, the particular speed being lower than the lower one of the particular limits, and third means responsive to the non-rotation of the sprocket for a particular period of time for discontinuing the operation of the bicycle in the automatic mode.

45. In combination, a bicycle having front and rear wheels and a sprocket and a pedal crank for driving the sprocket and a gear chain in engagement with the sprocket and a plurality of gears on the rear wheel, the gear chain being adjustable in position relative to the gears on the rear wheel to provide an engagement between individual ones of the gears and the gear chain, a sensor disposed on an individual one of the sprocket and the frame, signal producing means disposed on the other one of the sprocket and the frame to energize the sensor in accordance with the rotation of the sprocket relative to the frame, and first means operative in an automatic mode and responsive only to the signals from the sensor for adjusting the position of the gear chain relative to the gears on the rear wheel to maintain the speed of rotation of the sprocket within particular limits, and second means for discontinuing the operation of the first means and for converting the operation of the bicycle to a manual mode where the position of the gear chain relative to the gears on the rear wheel is adjusted manually.

46. In combination, a bicycle having front and rear wheels and a sprocket and a pedal crank for driving the sprocket and a gear chain in engagement with the sprocket and a plurality of gears on the rear wheel, the gear chain being adjustable in position relative to the gears on the rear wheel to provide an engagement between individual ones of the gears and the gear chain, a sensor disposed on an individual one of the sprocket and the frame, signal producing means disposed on the other one of the sprocket and the frame to energize the sensor in accordance with the rotation of the sprocket relative to the frame, means operative in an automatic mode and responsive only to the signals from the sensor for adjusting the position of the gear chain relative to the gears on the rear wheel to maintain the speed of rotation of the sprocket within particular limits, and second means operative in the automatic mode for adjusting the upper and lower limits in which the sprocket rotates without providing for an adjustment in the position of the gear chain relative to the gears on the rear wheel.

47. In combination, a bicycle having front and rear wheels and a sprocket and a pedal crank for driving the sprocket and a gear chain in engagement with the sprocket and a plurality of gears on the rear wheel, the gear chain being adjustable in position relative to the gears on the rear wheel to provide an engagement between individual ones of the gears and the gear chain, first means disposed on one of the sprocket and the frame to provide a signal, sensor means disposed on the other one of the sprocket and the frame and responsive to the signal from the first means during the rotation of the sprocket relative to the frame for producing signals in accordance with the rotation of the sprocket relative to the frame, means operative in an automatic mode and responsive to the signals from the sensor means for adjusting the position of the gear chain relative to the gears on the rear wheel to maintain the speed of rotation of the sprocket within upper and lower limits, and means operative in the automatic mode for adjusting the upper and lower limits of the sprocket speed of rotation.

48. In a combination as recited in claim 47, means operative in the automatic mode for disregarding the upper and lower limits of sprocket speed when the sprocket is rotating at a speed below a particular value, the particular value of speed being below the lower limit of sprocket speed.

49. In a combination as set forth in claim 47, means operative in the automatic mode for discontinuing the operation of the bicycle in the automatic mode when the sprocket has a zero speed for a time greater than a limited period of time.

50. In a combination as set forth in claim 47, means operative in the automatic mode for initializing the operation of the bicycle with the upper and lower limits existing at the end of the previous operation of the bicycle in the automatic mode.

51. In combination, a bicycle having front and rear wheels and a sprocket and a gear chain in engagement with the sprocket and a plurality of gears on the rear wheel, the gear chain being adjustable in position relative to the gears on the rear wheel to provide an engagement between individual ones of the gears and the gear chain, first means disposed on one of the sprocket and the frame to provide a signal, sensor means disposed on the other one of the sprocket and the frame and responsive to the signal from the first means during the rotation of the sprocket relative to the frame for producing signals in accordance with the rotation of the sprocket relative to the frame, means operative in an automatic mode and responsive to the signals from the sensor means for adjusting the position of the gear chain relative to the gears on the rear wheel to maintain the speed of rotation of the sprocket within upper and lower limits, means including switching means operative in the automatic mode in a first relationship for adjusting the upper and lower limits, and means including the switching means operative in the automatic mode in a second relationship different from the first relationship for converting to a manual operation the adjustment in the gear chain relative to the gears on the rear wheel and for adjusting the gear chain relative to the gears on the rear wheel in accordance with the operation of the switching means in the second relationship.

52. In a combination as set forth in claim 51, means operative in the automatic mode for disregarding any rotation of the sprocket at a speed below a particular value in connection with any adjustment in the position of the gear chain relative to the gears on the rear wheel, the particular value being below the upper and lower limits.

53. In a combination as set forth in claim 52, means operative in the automatic mode for the operation of the bicycle in the automatic mode when the sprocket has a zero speed for a limited period of time.

54. In a combination as set forth in claim 52, means operative in the automatic mode for initializing the operation of the bicycle with the upper and lower limits existing at the end of the previous operation of the bicycle in the automatic mode.

55. In combination, a bicycle having front and rear wheels and having a sprocket and a pedal crank operatively coupled to the sprocket for driving the sprocket and having a gear on the sprocket and having a plurality of gears on the rear wheel and having a gear chain operatively coupled to the gear on the sprocket and individual ones of the gears on the rear wheel, the gear chain being adjustable relative to the gears on the rear wheel to provide for the coupling of the gear chain to the individual ones of the gears on the rear wheel, first means operative in an automatic mode for providing for an adjustment of the gear chain relative to the gears on the rear wheel upon a rotary speed of the sprocket below a first particular value to decrease the ratio between the individual one of the gears on the rear wheel relative to the gear on the sprocket and to increase the sprocket speed, and second means operative in the automatic mode for adjusting the first particular value, during the operation of the first means in the automatic mode, in providing the adjustment of the gear chain relative to the gears on the rear wheel.

56. In a combination as set forth in claim 55, third means operative in the automatic mode and responsive to a rotary speed of the sprocket below a second particular value for preventing any adjustment of the gear chain relative to the gears on the rear wheel, the second particular value being lower than the first particular value.

57. In a combination as set forth in claim 56, fourth means operative in the automatic mode and responsive to the rotary speed of the sprocket below the second particular value for longer than a particular period for disabling adjustments by the first means of the gear chain relative to the gears on the rear wheel and adjustments by the second means of the sprocket speed.

58. In a combination as set forth in claim 55, means for discontinuing the operation of the first and second means in the automatic mode and for providing for a manual adjustment of the gears on the rear wheel.

* * * * *